United States Patent [19]

Duncan

[11] Patent Number: 5,198,053
[45] Date of Patent: Mar. 30, 1993

[54] METHOD AND APPARATUS FOR BONDING POLYTETRAFLUOROETHYLENE TO A METAL SUBSTRATE AND ARTICLES THEREBY PRODUCED

[75] Inventor: Eugene A. Duncan, Saline, Mich.

[73] Assignee: Mather Seal Company, Milan, Mich.

[21] Appl. No.: 741,929

[22] Filed: Aug. 8, 1991

Related U.S. Application Data

[63] Continuation of Ser. No. 259,068, Oct. 18, 1988, abandoned.

[51] Int. Cl.$^5$ ............................................. B32B 31/00
[52] U.S. Cl. ................................... 156/64; 156/272.4; 156/293; 156/333; 156/378; 277/152; 428/422
[58] Field of Search ..................... 156/272.4, 308.2, 64, 156/350, 333, 378, 293; 428/422; 277/152

[56] References Cited

U.S. PATENT DOCUMENTS

| | | | |
|---|---|---|---|
| 3,315,348 | 4/1967 | Donovan et al. | 156/272.4 |
| 3,462,333 | 8/1969 | McCormick et al. | 156/245 |
| 3,503,823 | 3/1970 | Richart et al. | 156/272.4 |
| 3,556,887 | 1/1971 | Adcock et al. | 156/272.2 |
| 3,749,621 | 7/1973 | Shoffner | 156/272.4 |
| 3,946,136 | 3/1976 | Fitz et al. | 428/422 |

FOREIGN PATENT DOCUMENTS

| | | |
|---|---|---|
| 952997 | 11/1956 | Fed. Rep. of Germany . |
| 2521734 | 1/1976 | Fed. Rep. of Germany . |
| 3038069 | 4/1982 | Fed. Rep. of Germany ... 156/272.4 |
| 41988A1 | 5/1986 | Fed. Rep. of Germany . |
| 1495666 | 9/1966 | France . |

OTHER PUBLICATIONS

Vol. 4, No. 125 (M-30) (607) Sep. 3, 1980, p. 151M30 "Patent Abstracts of Japan", abstract only.

Primary Examiner—John J. Gallagher
Attorney, Agent, or Firm—Lawrence J. Shurupoff

[57] ABSTRACT

Polytetrafluoroethylene (PTFE) is bonded to a metal substrate such as an oil seal casing via an intermediary bonding layer of fluorinated ethylene propylene (FEP). Induction heating is used to rapidly melt the FEP and PTFE without degrading their physical properties. The induction heating unit is preferably controlled by a temperature signal representing the temperature of the metal substrate.

16 Claims, 4 Drawing Sheets

METHOD AND APPARATUS FOR BONDING POLYTETRAFLUOROETHYLENE TO A METAL SUBSTRATE AND ARTICLES THEREBY PRODUCED

This is a continuation of application Ser. No. 259,068, filed Oct. 18, 1988, now abandoned.

BACKGROUND OF THE INVENTION

1. Field of the Invention

This invention relates generally to a method and apparatus for bonding polytetrafluoroethylene (PTFE) to a metal substrate. An intermediary layer, preferably fluorinated ethylene propylene (FEP), is completely melted while the PTFE is partially melted to form a strong mechanical bond between the PTFE and the metal substrate.

2. Description of Prior Developments

Prior attempts to bond PTFE to metal have met with varying degrees of success. For example, U.S. Pat. No. 3,462,333 to McCormick discloses a method of bonding a PTFE wafer to a metal casing using an intermediary bonding layer of FEP. Although a bond may be formed using this method, the physical properties of the PTFE are altered so as to render the PTFE unsuitable for certain applications. More particularly, the entire PTFE element in McCormick is subjected to high temperatures which are sustained over a period of time sufficient to melt and resinter the entire PTFE element and thereby alter its internal physical structure, particularly its crystallinity.

When PTFE is heated to its gel or melting temperature of approximately 621° F., its crystallinity begins to decrease. When this occurs, the physical properties of the PTFE begin to change. The lower the crystallinity of a PTFE element, the greater is its elastic memory. With increased elastic memory, a sintered PTFE element will return to its unstressed form more quickly and with greater force. Thus, as the crystallinity of the PTFE decreases, so does its dimensional stability as the PTFE gradually and unpredictably returns to its unstressed condition. This poses a significant problem in sealing applications where a PTFE sealing element must be accurately dimensioned to form a secure seal against a coacting member such as a shaft, housing, bore or the like.

Another problem associated with prolonged or excessive heating of a PTFE element is the loss of certain physical properties which may have been optimized during its initial production. That is, not only may cyrstallinity be optimized during the initial sintering of a PTFE element, but so may wear resistance. If a sintered PTFE element is held at temperatures at or near its gel temperature for any period of time, it is resintered and begins to experience molecular degradation wherein long molecules of PTFE are broken to form shorter molecules. Ideally, PTFE should be sintered only once in order to preserve its strength and wear resistance.

The shorter molecules formed during molecular degradation increase the crystallinity of the PTFE element. This results in a loss of resilience as well as a loss in wear resistance. Molecular degradation begins as soon as PTFE reaches its gel temperature. The greater the temperature of the PTFE above its gel temperature, the quicker is the rate and the greater is the degree of molecular degradation.

Thermal expansion poses another problem when heating and melting PTFE. Thermal expansion can increase the volume of a PTFE element up to about 20%. If a PTFE element is not constrained during heating, it will expand in a generally unpredictable manner and upon cooling and contraction will typically lose any carefully controlled dimensions formed previously. This is particularly troublesome if the PTFE element is used as a sealing lip which must maintain accurately controlled contact with a coacting sealing surface.

If the PTFE element is constrained in a mold or the like during heating, internal stresses will develop within the element. These stresses can, over time, produce dimensional changes in the element resulting in a corresponding loss of precision tolerances. On the other hand, if the PTFE element is not constrained during heating, all precision dimensions will likely be lost immediately. For example, a previously sintered PTFE element which has been machined to tolerances of +0.005 inch can easily deform during heating so as to produce post-heated tolerances of +0.020 inch.

A sintered PTFE element is, in effect, stress relieved during further heating and sintering and returns to a form which approximates its stress-free configuration. In the case of a PTFE element which has been precision machined for use as a radial lip sealing member, the loss of precision dimensions upon heating can result in unpredictable loading and wear between the PTFE sealing member and a rotating shaft or the like. Moreover, the contact pattern between the sealing member and shaft will likewise become unpredictable. In each case, poor sealing performance can be expected in the form of seal leakage or premature seal wear and premature seal failure.

Prior attempts to melt and bond PTFE to a metal substrate under heat and pressure have resulted in a dilemma that has heretofore remained unresolved. That is, the use of high melting temperatures for short periods of time has resulted in molecular degradation, while the use of lower melting temperatures (at or slightly above the gel temperature) for longer periods of time has also resulted in molecular degradation. In each case, by heating a PTFE element to a given temperature for a sufficient period of time to form a satisfactory bond, a loss of desirable physical properties has resulted.

When a PTFE element is heated at or slightly above its gel temperature, it takes a relatively long period of time for the entire element to gel. This is due to the low thermal conductivity of PTFE which reduces or slows the rate of heat transfer therethrough. If one attempts to avoid molecular degradation of a PTFE element by heating the element at or near its gel temperature, (as opposed to higher temperatures) it will take so long to completely melt or gel the entire element that the PTFE material which is initially gelled will remain gelled for so long that it will experience molecular degradation by the time the last of the PTFE material reaches its gel state. However, if one attempts to increase the rate of heat transfer by using higher melting temperatures and thus reduce the time the PTFE is in its gel state, the rate of molecular degradation has heretofore increased to unacceptable levels thereby causing a significant loss of physical properties.

Accordingly, a need exists for a method and apparatus for bonding PTFE to a metal substrate while minimizing molecular degradation and maximizing the dimensional stability of a PTFE element. A need also exists for a method and apparatus which reduces PTFE bonding time and increases production efficiency.

SUMMARY OF THE INVENTION

The present invention has been developed to fulfill the needs noted above and therefore has as a primary object the provision of a method and apparatus for bonding a PTFE element to a metal substrate while maintaining the desired physical properties and dimensions of the PTFE element.

Another object is the provision of a method and apparatus which reduces the time required to bond a PTFE element to a metal substrate and reduces the energy requirements and tooling costs for carrying out the bonding process.

These and other objects are met with the present invention which uses induction heating to rapidly heat a limited region of a PTFE element to its gel state via conduction heat transfer through a metal substrate. A layer of fluorinated ethylene propylene (FEP) is placed between the metal substrate and PTFE element to form a mechanical bond with both the metal and PTFE. Because induction heating results in an extremely fast temperature rise in the PTFE element, there is little opportunity for significant molecular degradation to occur, even at relatively high bonding temperatures.

A particularly important aspect of the invention is the partial melting or gelling of the PTFE element within a limited region over which bonding takes place. Preferably, only a small portion of the PTFE element is gelled or further sintered while the remainder is preserved in its original sintered state. This provides for excellent dimensional stability and maintains the predetermined optimal physical properties of the original PTFE material.

Another important aspect of the invention is the predictability of the bond formed according to the invention. While prior bonding attempts have generally met with erratic results, the present invention provides reliable, consistent, repeatable and controllable results in an economical manner.

BRIEF DESCRIPTION OF THE DRAWINGS

These and other objects and features of the invention will become apparent from a reading of a detailed description taken in conjunction with the drawings in which.

DETAILED DESCRIPTION OF THE PREFERRED EMBODIMENTS

Figure 1:
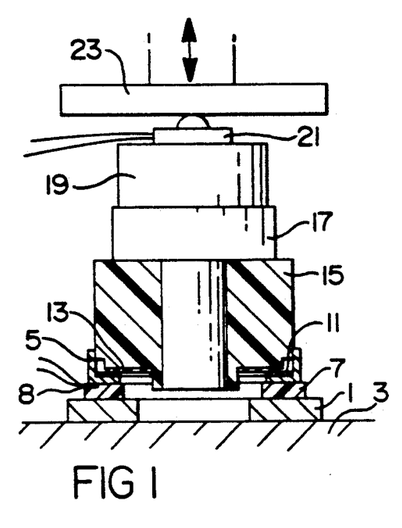
FIG. 1 is a schematic plan sectional view though a tooling setup used for producing a PTFE to metal bond.
Figures 2, 6, 7, 8, 11:
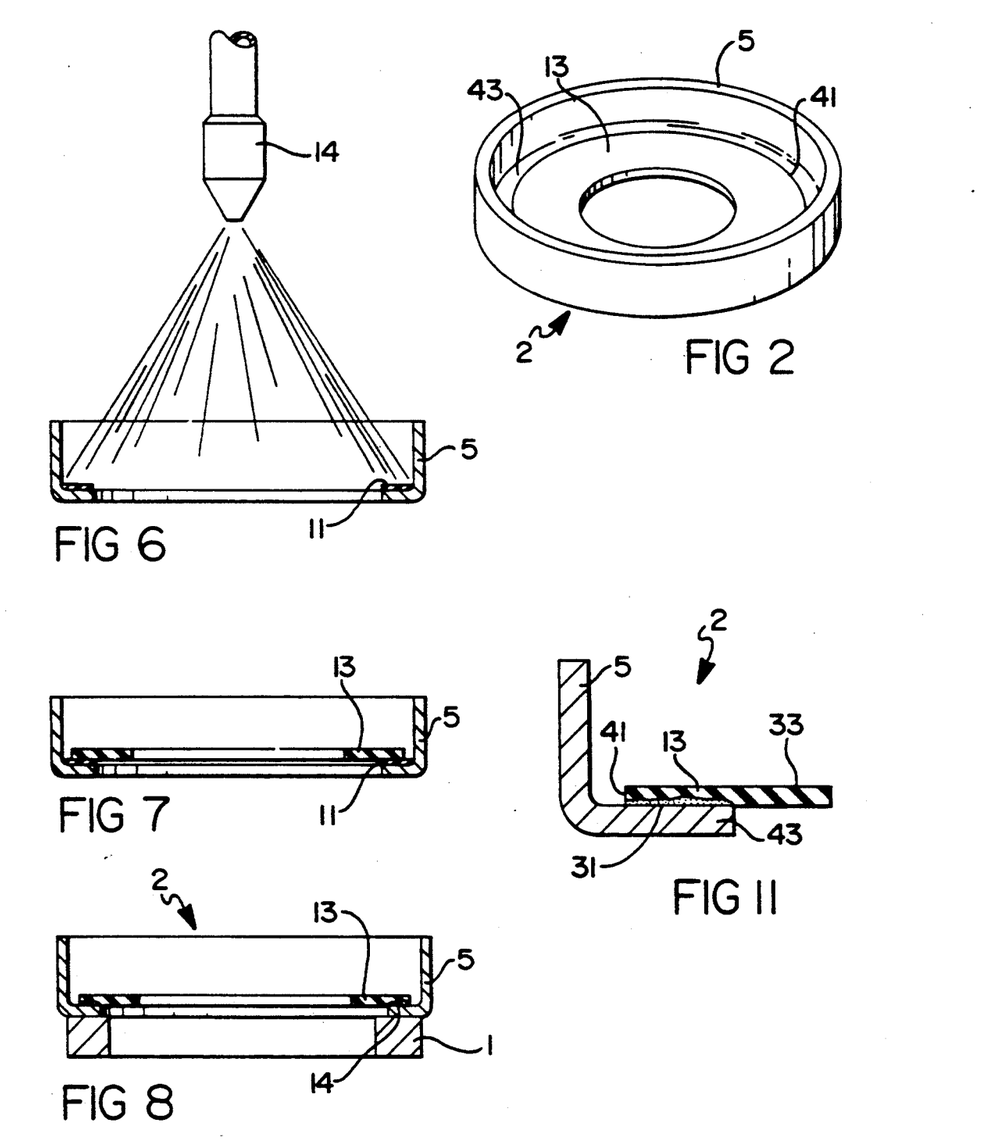
FIG. 2 is perspective view of a radial lip oil seal manufactured with the setup of FIG. 1.
FIG. 6 is a schematic partially sectioned view showing the application of a layer of FEP to a metal seal casing.
FIG. 7 is a central sectional view showing the placement of a PTFE element on the casing of FIG. 6.
FIG. 8 is a sectional view showing the alignment of the assembly of FIG. 7 upon an induction coil and the localized bonding between the PTFE element and metal casing after induction heating.
FIG. 11 is an enlarged fragmental sectional view of a seal formed according to the invention.

The present invention will now be described in conjunction with FIG. 1 which depicts a tooling setup used to bond a PTFE sealing element wafer to a metal case to form manufacture and a radial lip oil seal 2 such as shown in FIG. 2. While the invention will be discussed in terms of oil seal production, it should be emphasized that the invention is applicable to bonding any form of PTFE element to any type of metal substrate which may be induction heated. The term polytetrafluoroethylene (PTFE) as used herein is understood to include pure PTFE, filled PTFE and modified polymers of PTFE. Although various process parameters may require modification to suit a particular application, the basic process steps and apparatus will generally remain the same as discussed below.

As seen in FIG. 1, a single loop induction coil 1 is mounted on a support base 3 for induction heating a metal member such as annular ferromagnetic seal casing 5. The seal casing 5 is insulated from and spaced from the induction coil 1 via PTFE spacer ring 7. A temperature sensor such as thermocouple 8 is preferably placed between the coil 1 and the casing 5 to provide a signal for controlling the power delivered to the induction coil 1, as represented by the control schematic in FIG. 3.

Figures 1A, 13:
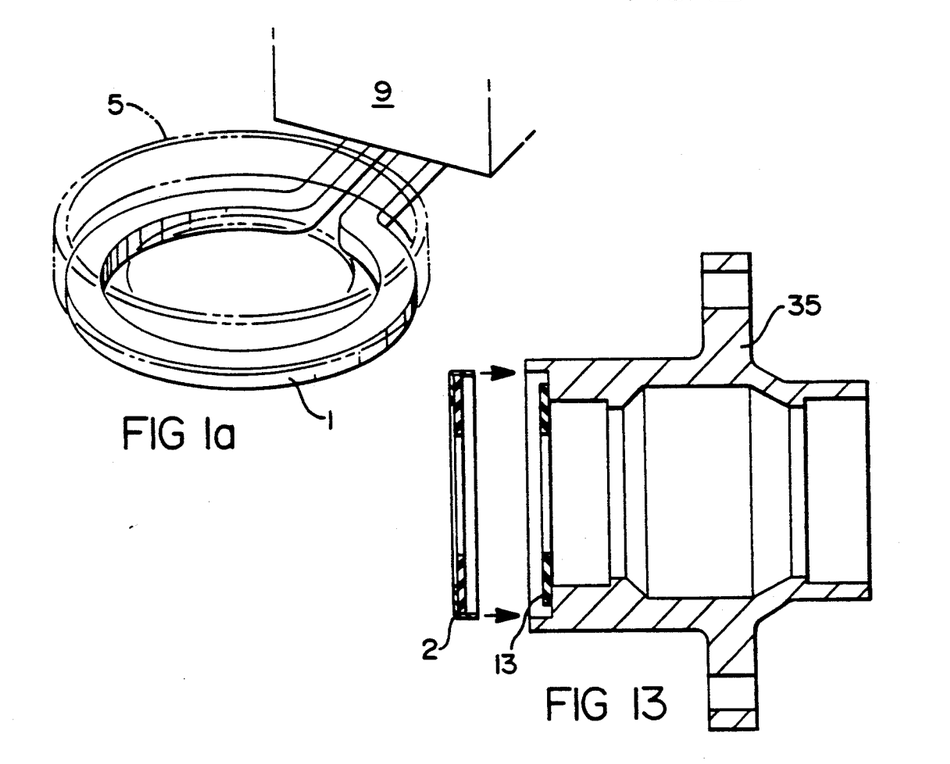
FIG. 1a is a schematic fragmental view of an induction coil showing an oil seal casing in phantom.
FIG. 13 is a view of FIG. 12 showing a typical seal replacement or repair procedure.
Figure 4:
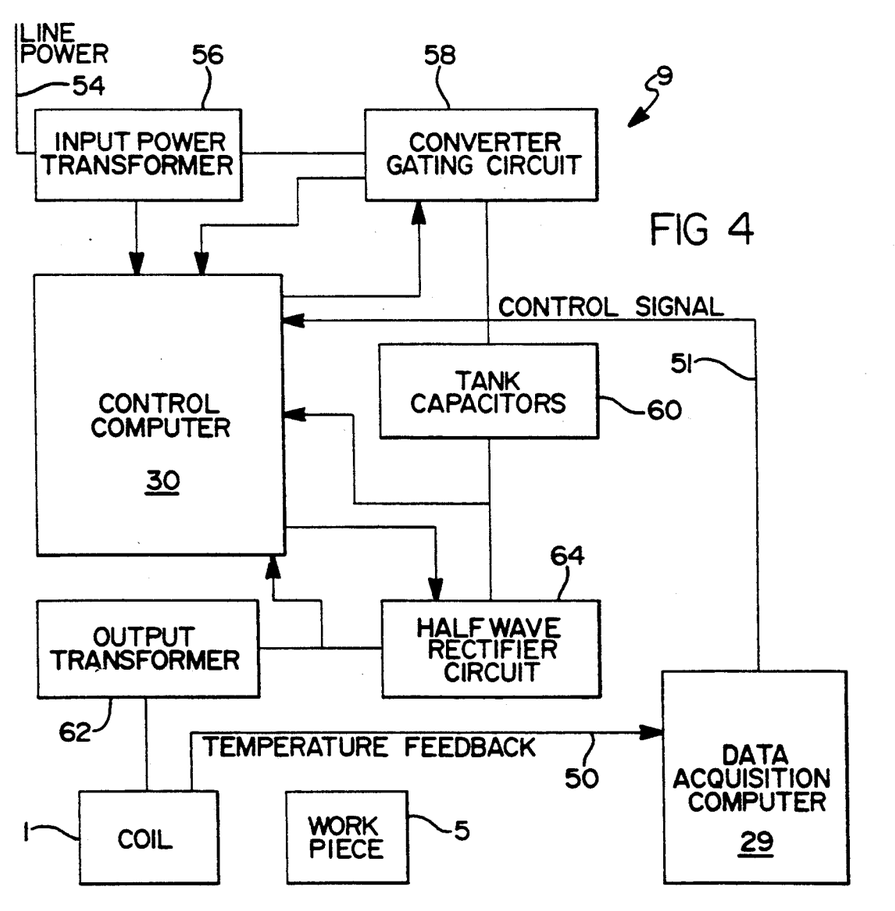
FIG. 4 is a schematic diagram of an induction heating unit used to power the induction coil of FIG. 1.

The induction coil 1 as seen in FIG. 1(a) is powered by an induction unit 9 of the type schematically outlined in FIG. 4. Induction unit 9 is available from the American Induction Heating Corporation of Detroit, Mich. The unit employs an Enercon Industries Corporation Type EC Parallel Resonant Current Source Converter capable of delivering 10KW of power at 10KHz frequency. The Enercon Solid State Power Supply is a frequency converter which uses static switching techniques to change three-phase line frequency input power into a single phase output at the required frequency. The power supply circuit uses a thyristor to rapidly switch high power levels when triggered by low level control signals.

The frequency of oscillation and power output of the induction unit 9 are controlled by a microprocessor circuit which receives signals from various electronic circuitry and sensors such as thermocouple 8. The 10KW/10KHz chopper type power supply is known informally as a "screamer" due to the audible frequencies produced during its operation. A bank of six capacitors form an adjustable tank capacitance. The output transformer is a single turn secondary (to which coil 1 is coupled), water cooled type with adjustable primary turns set at seventeen for a 17:1 ratio.

The size, shape and number of turns of the induction coil 1 will vary based on the geometry of the metal member or seal casing 5 being heated. The size and shape of the spacer 7 will also vary due to the sensitivity of the relative position of the seal casing and the field produced by the coil. In order to obtain an effective bond between the PTFE element and the casing 5, it is preferred to interpose a layer 11 of a bonding agent such as a fluorinated resin having a melting point lower than PTFE between the PTFE element 13 and the casing 5. Such fluorinated resin may include fluorocarbons such as fluorinated ethylene propylene (FEP) which is a copolymer of tetrafluoroethylene and hexafluoropropylene. Perfluoroalkoxy resins may also be used as a bonding agent.

Figure 5:
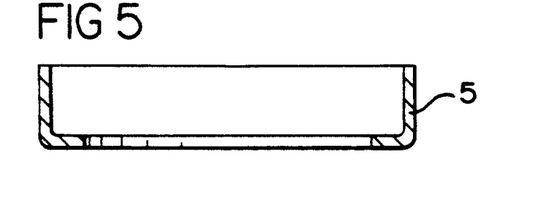
FIG. 5 is a sectional view through a central portion of a metal seal casing.

In a particularly preferred embodiment, FEP powder having a particle size of 0.1-3 microns may be applied to the casing 5 (FIG. 5) in a solvent or carrier dispersion using standard air-operated spray painting equipment 12 as shown in FIG. 6. The PTFE element 13 may then be centered over the casing 5 as seen in FIG. 7. The FEP-coated casing 5 and PTFE element 13 may then be centered over the induction coil 1 as seen in FIGS. 1 and 8, and heated to form an annular bond 14.

For ordinary 5% glass, 5% molybdenum disulfide filled PTFE seal elements, a satisfactory dispersion for spraying the FEP was found to contain about 50% by volume of isopropyl alcohol (reagent grade, low residue) with the remainder containing dimethyl formamide, ethylene glycol and water. About 200 grams of FEP powder are added to one liter of this solvent solution. However, any solvent may be used which wets the PTFE and then dries, such as 100% methyl ethyl ketone (MEK) or 100% isopropyl alcohol.

For the production of oil seals, it has been found desirable to spray a relatively thick coating of FEP on the casing, with a final dried thickness of 1 or 2 mils. The FEP film layer 11 should be dry prior to bonding. Although a dry film coating of FEP is presently used, any method of FEP application could be employed including a hot melt application of FEP, a thin sheet of FEP or a FEP coating applied by dipping. Of course, other bonding agents or mixtures thereof could be applied in a similar manner.

Due to the high temperatures required for this type of bonding process, surface contamination of the metal casing does not pose a major problem. Although no surface preparation of the metal casing is required, improved bond strengths can be achieved by cleaning and grit blasting as suggested in Table 1. Various metal preparations are listed in Table 1, with corresponding peel strengths identified. Peel strength relates to the force required to peel a one inch wide PTFE strip from a metal substrate after bonding.

TABLE 1

| Metal Preparation | Peel Strength | Remarks |
| --- | --- | --- |
| As received from stamper, with no cleaning of any kind. | 5-17 lb/in | Heavy smoke and carburized residue during heat cycle |
| As received from stamper, rinsed in MEK - 12 seal casings/liter max. | 15-19 lb/in | No smoke, consistent and uniform bond all around |
| As received from stamper, rinsed in MEK then rinsed in Isopropyl alcohol, oven dried | 15-19 lb/in | Same as above |
| Grit blasted (silica), no further cleaning | 22-28 lb/in | Light smoke and carburized residue during heat cycle |
| Grit blasted (silica), rinsed in MEK followed by Isopropyl alcohol | 28-32 lb/in | PTFE element tearing (rather than bond failing) in all pulls, light discoloration |
| Grit blasted (silica), ultrasonic clean (water emulsification), distilled water rinse, oven dry | 34-38 lb/in | PTFE element tearing (rather than bond failing) in all pulls, portions of element surface ripped out and remained on metal surface during extended pull |

Referring again to FIG. 1, it is seen that the FEP coated seal casing 5 may be first placed on the spacer ring 7 and the PTFE element 13 subsequently aligned over the FEP coating 11. Any type of filled or unfilled PTFE material may be used according to the invention for bonding to the metal casing. However, 15% glass filled PTFE material is preferred for the spacer ring 7 and the PTFE pressure plug 15 which centers the PTFE element 13 on the metal seal casing 5.

The PTFE pressure plug 15 not only provides thermal insulation to concentrate the induction heating within the metal casing 5, but plug 15 also provides a somewhat resilient surface to promote uniform pressure distribution between the PTFE element 13 and the metal seal casing 5. It is of course possible to form the spacer ring 7 and pressure plug 15 from ceramic or other non-ferromagnetic materials.

Due to the magnetic field produced by the induction coil 1, and due to the thin cross-section of the PTFE material of element 13, metallic tooling can not be considered practical for this particular seal application. As discussed further below, only one side of the PTFE element is melted or gelled. If metallic tooling such as aluminum were used, it would act as a heat sink, thereby extending the time and energy required to produce the bond and thereby promoting molecular degradation.

A resilient polyurethane spacer disk 17 may be placed over the pressure plug 15 to further compensate for any possible non-planar contact or non-parallel alignment between the various tooling components. A particular advantage of the polyurethane spacer disk is its ability to maintain a substantially constant applied load on the PTFE element 13 and casing 5, notwithstanding any axially directed thermal expansion of the PTFE tooling components and PTFE element during induction heating.

A load cell support disk 19 may be located on top of the polyurethane spacer disk and a load cell 21 may be placed on top of the disk 19 to monitor bonding pressures. A hydraulic ram 23 is positioned over the entire stacked set up. For a seal casing and PTFE element having a mutual contact surface area of 0.785 in$^2$, a contact pressure within the range of 200-450 psi was found acceptable for producing consistently strong and reliable bonds.

The upper bonding pressure limit is established by the particular time/temperature profile to which the PTFE element is exposed. As the PTFE element absorbs heat it begins to soften. The softened PTFE can then undergo deformation in the form of "cold flow" under excessive ram pressure. This can result in catastrophic material failure where the PTFE element 13 is either completely sheared off along the inner diameter of the seal casing 5, or is fractured in planar shear along the PTFE/metal interface.

Various contact loads applied by the ram 23 and corresponding peel strengths are listed in Table 2:

TABLE 2

| Seal # | Contact Load | Pressure | Peel Strength |
| --- | --- | --- | --- |
| 1-2 | 100 lbs. | 127 psi | 31-31 lb/in |
| 3-4 | 200 lbs. | 254 psi | 34-36 lb/in |
| 5-6 | 300 lbs. | 382 psi | 34-36 lb/in |
| 7-8 | 400 lbs. | 509 psi | 29-34 lb/in |
| 9 | 500 lbs. | 636 psi | sheared off |

It should be noted that the peel strengths for seals #5 through #8 reflect the PTFE element ripping rather than failure of the PTFE/FEP/metal bond.

Figure 9:
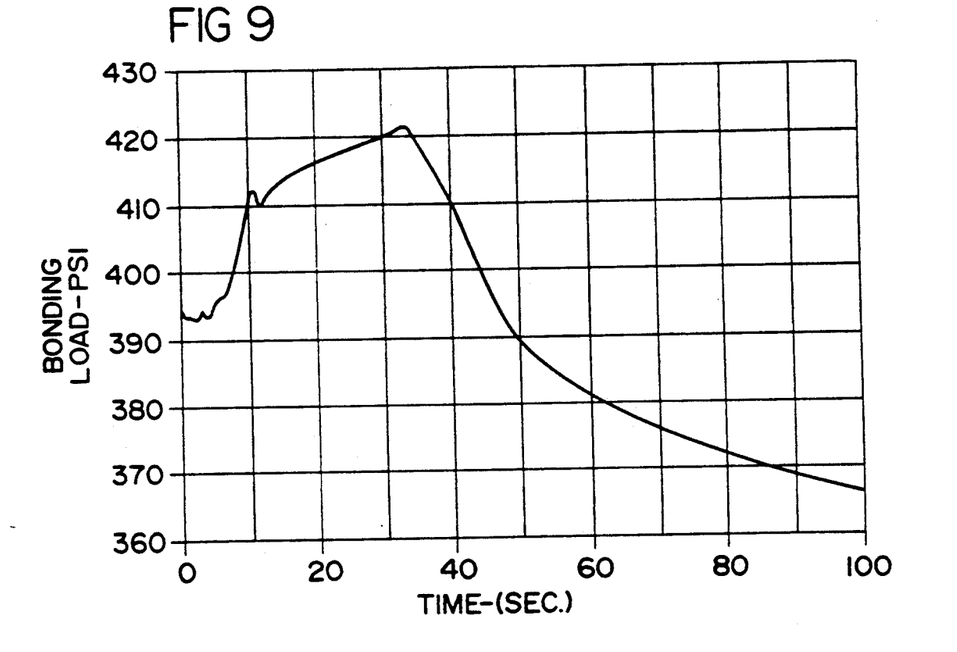
FIG. 9 is a graph of bonding pressure as a function of time.
Figure 10:
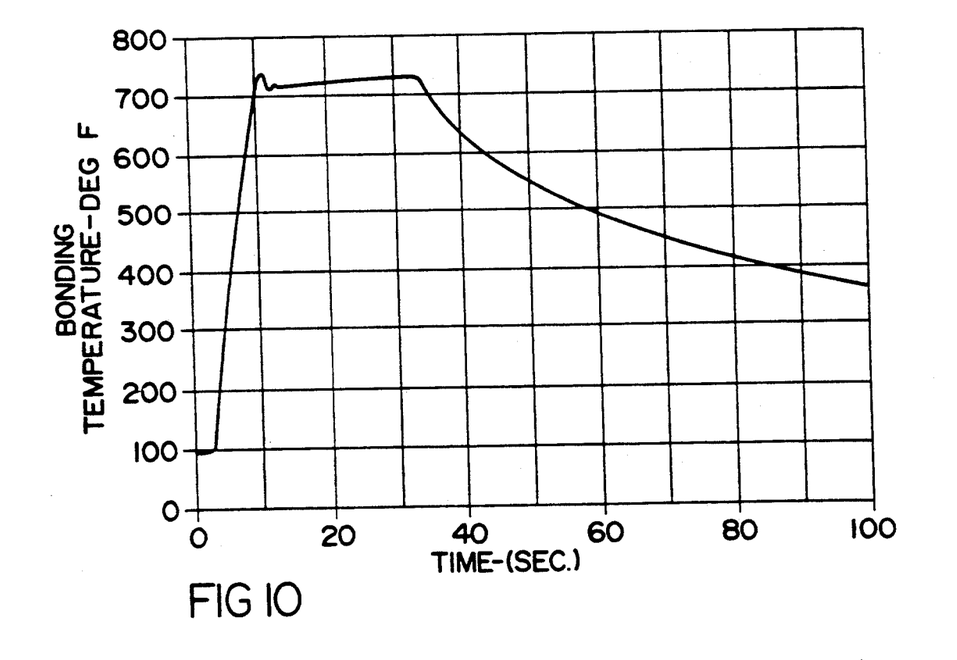
FIG. 10 is a graph of bonding temperature as a function of time.

Typical pressure and temperature bonding cycles are respectively shown in FIGS. 9 and 10 for seals 5 and 6 of Table 2. A 30 second overall bonding cycle time was used for all of the seals identified in Table 2. Seals 5 and 6 were found to exhibit particularly good bonds. The PTFE elements were made from 5% glass, 5% moly filled PTFE material cut to a thickness of 0.025 inch.

Figure 3:
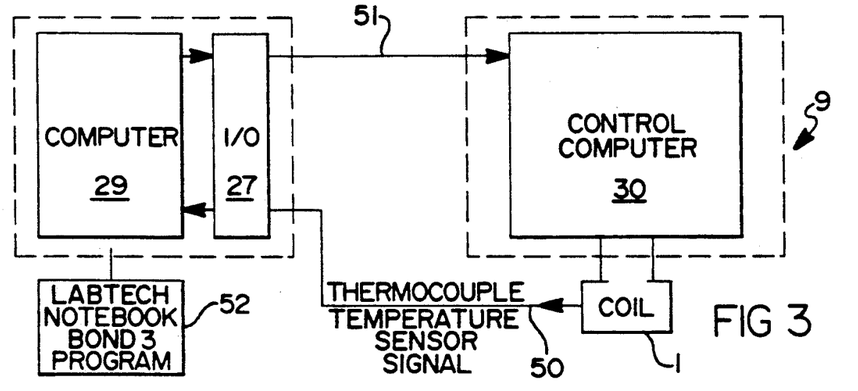
FIG. 3 is a schematic diagram of a closed loop feedback control circuit for controlling bonding temperature.

The cycle time and temperature profile represented in FIG. 10 is controlled with a closed loop temperature feedback system schematically depicted in FIGS. 3 and 4. Although it is possible to produce a satisfactory PTFE to metal bond using only the power level controls and timers typically available on the induction unit 9, more consistent and reliable bonds can be produced by controlling the power level of the induction unit based on the actual real time temperature of the metal casing 5.

It was found that minor variations in the initial (room) temperature of the metal casing 5 would result in significant variations in its final temperature if the induction unit 9 was set at a given power duty cycle over corresponding predetermined time intervals. For example, with fixed power cycles, a 5° F. increase in the ambient temperature of the seal casing could result in a 100° F. increase in the maximum temperature of the PTFE element during bonding. As indicated earlier, excessive temperatures above the gel temperature promote rapid molecular degradation.

Thus, in order to minimize and control molecular degradation of both the PTFE and the bonding agent, the power level of the induction unit 9 is preferably controlled directly from a temperature signal provided by thermocouple 8 in direct contact with the metal case element 5. The signal from thermocouple 8 is fed to a signal conditioning module 27 (FIGS. 3 and 4) which scales the signal to an acceptable value for input into computer 27. Computer 29 may take the form of a PC/AT or the like and may be programmed to generate a control signal using commercially available software.

The software used for controlling the induction unit to produce the time-temperature curve in FIG. 10 was a commercially available Labtech Notebook Proportional—Integral—Derivative (PID) algorithm. However, any other control program may be adapted to produce acceptable results. Based on the value of the input signal from the thermocouple 8, computer 27 will produce a control signal for input into the control computer 30 which controls the power output of the induction unit 9.

As further seen in FIG. 10, the temperature of the metal casing 5 is initially raised from room temperature (about 100° F.) to about 720° F. in about six seconds. The induction unit 9 is programmed to produce full or maximum output power until thermocouple 8 produces a control signal indicating that the temperature of the metal casing has reached about 700° F. At this point, computer 29 feeds a signal to computer 30 to cut the power As further seen in FIG. 10, an overshoot of about 30° F. occurs, followed by an approximate 20° F. drop during a brief power off cycle. Once the temperature of the metal case returns to a desired bonding temperature (about 710° F.), the power is increased to about 30–40% of maximum output to maintain the casing 5 at this temperature. After a bonding period of about 20 seconds at about 710° F., the power is cut off completely to allow the case and PTFE element to cool, preferably under pressure and until the case 5 reaches a temperature of 300° F. or less.

It is desirable to reduce or cut off the power anywhere from about 10° F. to 40° F. below the desired bonding temperature in order to allow for the temperature overshoot. At temperatures above 700° F., significant molecular degradation can take place in the FEP in a matter of a few seconds. Thus, a short bonding time is essential for a strong reliable bond.

It is advantageous to raise the temperature of the metal case as quickly as possible from room temperature to the melting temperature of PTFE, (621° F.) or above, in order to achieve the most rapid melting of the PTFE as possible. The heating of the PTFE to its melting point should take place as rapidly as possible, i.e. in less than 60 seconds and preferably in less than 10 seconds. In order to minimize molecular degradation of the PTFE material and the bonding agent (FEP), the metal case must be heated to a temperature of about 50° F. to 90° F. above the melting temperature of PTFE in order to achieve a rapid rate of heat transfer from the metal case to the PTFE element. However, it has been found that for certain applications, acceptable rates of heat transfer can be obtained by heating the metal case member to a temperature between 621° F. and 800° F.

Specifically, it has been found that molecular degradation can be minimized by heating the metal case to a temperature between 680° F. to about 740° F. and preferably between 690° F. and 710° F. After the metal case has been rapidly heated to a suitable temperature above the melting or gel temperature of PTFE, such as the 720° F. temperature shown in FIG. 10, it has been found that a strong bond between the PTFE and metal may be formed within a period of about 10 seconds up to 60 seconds. It is preferable to maintain the PTFE in its gel state for as short a time as possible i.e. less than 60 seconds, and preferably within 15 to 30 seconds.

Although molecular degradation is a primary consideration in minimizing the time and temperature of the PTFE in its gel state, the same considerations apply to the bonding agent such as FEP which has a lower melting temperature than PTFE. If the FEP experiences excessive molecular degradation the bond will fail, and in extreme cases the FEP will turn into powder. Moreover, this time-temperature relationship is also of importance in controlling the dimensions of the final bonded product. That is, as the temperature of the PTFE element is increased, it begins to soften. The higher the bonding temperature is maintained above the gel temperature of PTFE, and the longer this temperature is maintained, the softer the PTFE becomes.

Since the PTFE element is clamped to the FEP coated metal case throughout the bonding process, the clamping or bonding pressure applied by the ram (such as represented in FIG. 9) can cause uncontrolled flow of the PTFE if it is excessively softened. This can result in defective bonds and/or loss of dimensional control of the PTFE element. Although a substantially constant bonding pressure is applied by ram or press 23, the bonding pressure will vary due to the thermal expansion of the tooling and parts being bonded. A relatively uniform bonding pressure is desirable.

A major aspect of the present invention is directed to the avoidance of excessive softening of the PTFE element and the drawbacks which accompany such material softening. This is achieved by controlling and limiting the application of bonding temperatures to a specific region of the PTFE element. More particularly as shown in FIGS. 8 and 11, only one face of the radial outer portion of the PTFE element contacts the hot metal case so that direct conduction heat transfer is limited to this region. While only one PTFE element is shown, two PTFE elements could be simultaneously bonded to opposite sides of the metal case.

Although heat from the metal case is transferred through the PTFE element, the extent over which the heat is transferred is controlled by the bonding temperature (i.e. the temperature of the metal case) and the time over which the bonding temperature is maintained. Application of the pressures and temperatures according to the cycle times as shown in FIGS. 9 and 10 to the PTFE element shown in FIGS. 1 and 8 will result in controlled localized melting of the PTFE element. By limiting the localized melting to a predetermined surface area and to a predetermined depth, the initial or original physical properties of the sintered PTFE element may be preserved and precision tolerances on the PTFE element may be maintained.

As seen in FIG. 11, only a thin bond layer 31 of the intermingled FEP and PTFE is melted during bonding. This layer is typically a small fraction of the thickness of the PTFE element being bonded although the entire layer of FEP is preferably melted. In the case of an oil seal having a thickness of 0.025 inch, bond layer 31 may range from about 0.005 to 0.010 inch thick.

What is important to note is that the major portion of the PTFE element 13 remains unaffected by the localized melting. The radially inner lip portion 33 (FIG. 11) of the PTFE element 13 which projects from casing 5 serves as the contact sealing surface of the seal is virtually unaffected by the induction heating and therefore maintains its original dimensions and wear resistance properties.

Figure 12:
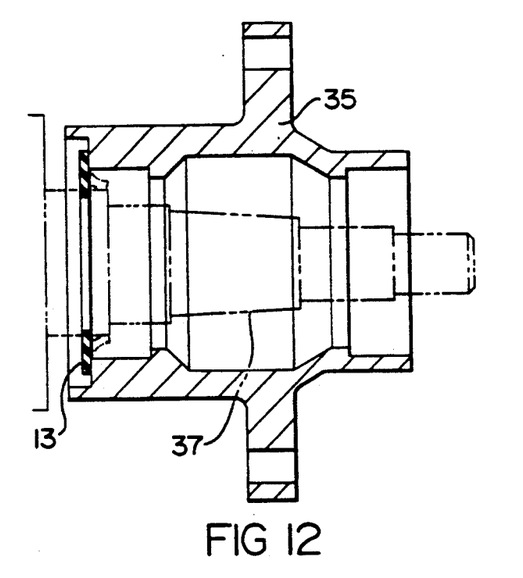
FIG. 12 is a plan sectional view through a wheel hub, showing a wheel axle in phantom.

As suggested earlier, the invention may be broadly applied to include bonding between any PTFE element and any induction heatable substrate. In fact, any heating means may be used as long as the time and temperature cycles are controlled as discussed above. For example, as seen in FIG. 12, an annular PTFE element 13 may be bonded directly to its application site such as wheel hub 35. Wheel hub 35 is typically mounted over an axle or shaft 37 as shown in phantom.

The construction depicted in FIG. 12 obviates the use of a seal casing 5, as the element 13, which forms a radial lip oil seal, is directly anchored to the hub 35 with a layer of FEP as described above. An induction field may be applied directly to the hub 35 as pressure is applied to element 13 in any suitable fashion. Should the sealing arrangement of FIG. 12 require replacement, the metal cased seal 2 shown in FIGS. 2 and 13 may be installed in a conventional manner directly over element 13. Alternative sealing applications include induction bonding a PTFE sealing element directly to a housing member such as a transmission housing, engine block, compressor housing, fuel pump housing, crankshaft seal carrier, front engine cover, etc.

The method and apparatus described above provides an efficient means for producing uniform reliable bonds between a PTFE element and a metal or induction heatable substrate. As opposed to prior apparatus which required an entire mold to be heated for melting or bonding material to a PTFE element, the subject invention induction heats only the workpiece. This not only reduces energy requirements for heating, but allows only a portion of the PTFE element to be heated as opposed to prior methods which, by necessity, heated the entire PTFE element within a mold. Thus, the physical properties of the PTFE wafer which were previously dictated by the molding times and mold temperatures are now controlled by the original carefully controlled initial sintering of the PTFE.

Because the bonding cycle time is much shorter using induction heating as compared to prior heating methods, the present invention is particularly well suited to high volume automated production. Moreover, the tooling setup expense required for achieving a given high volume production rate is much lower with the present invention than with conventional mold setups.

As the bond formed according to the present invention is extremely strong, it need not extend over as large a surface area as prior bonds. This allows for savings in the form of reduced PTFE material costs. For example, as seen in FIGS. 2 and 11, the outer diameter 41 of the PTFE element 13 need not extend over the entire surface of radial flange 43 to form an adequate bond. Thus the diameter of element 13 may be reduced compared to prior designs, thereby reducing the amount of PTFE required to form the seal 2.

Obviously, numerous modifications and variations of the present invention are possible in light of the above teachings. It is therefore to be understood that within the scope of the appended claims, the invention may be practiced otherwise than as specifically described herein.

What is claimed is:

1. A method for bonding a first seal element comprising polytetrafluorethylene having predetermined physical properties to a second element capable of being heated by an induction heating apparatus so as to form a radial lip seal, wherein said method comprises:

providing a layer of a fluorinated resin adhesive having a melting point lower than said polytetrafluorethylene between said first and second elements;

contacting said first and second elements;

induction heating said second element to a temperature of at least the melting temperature of polytetrafluoroethylene in less than about 60 seconds so as to melt said resin;

maintaining said second element at said temperature of at least the melting temperature of polytetrafluoroethylene for a time period in which only a minor portion of said polytetrafluoroethylene is melted, said melting of said minor portion of said polytetrafluorethylene being insufficient to significantly alter the predetermined physical properties of unmelted portions of said first element;

controlling said induction heating with a temperature signal representing the temperature of said second element; and cooling said first and second elements so as to form a bond therebetween.

2. A method for manufacturing a seal by bonding a sealing element wafer comprising polytetrafluoroethylene to an inductively heatable substrate, said wafer having first and second opposed sides separated by a predetermined thickness, said wafer being formed with predetermined physical properties, wherein said method comprises:

interposing a layer of a fluorinated resin having a melting point below the melting point of said wafer between said substrate and at least a portion of said first side of said wafer; and applying inductively generated heat and external pressure to said wafer, to said substrate and to said resin to form a bond between a limited portion of said first side of said wafer and said substrate by rapidly melting said resin and only a portion of said thickness of said wafer adjacent said limited portion of said first side without melting said second side during formation of said bond by limiting application of said heat and external pressure to said bond within predetermined ranges for controlled periods of time such that said predetermined physical properties of unmelted portions of said wafer are not significantly altered.

3. The method of claim 2, wherein said substrate comprises a seal casing, wherein said wafer comprises a radial lip seal element having a contact sealing surface portion projecting from said casing, and wherein said melting is limited to a region separated from said contact sealing surface and located between said casing and said wafer.

4. The method according to claim 2, wherein said fluorinated resin is a fluorocarbon resin.

5. The method according to claim 2, wherein said fluorocarbon resin is fluorinated ethylene propylene.

6. The method according to claim 2, wherein said fluorinated resin is perfluoroalkoxy resin.

7. The method according to claim 2, wherein said substrate is heated to a temperature of at least the melting temperature of polytetrafluoroethylene in less than 10 seconds.

8. The method according to claim 2, wherein said substrate is heated to a temperature between 621° and 800° F.

9. The method according to claim 2, wherein said substrate is heated to a temperature of about 50° to 90° F. above the melting temperature of polytetrafluoroethylene.

10. The method according to claim 2, wherein said substrate is heated to a temperature of between 690° and 710° F.

11. The method according to claim 9, wherein said substrate is maintained at said temperature for up to 60 seconds.

12. The method according to claim 11, wherein said substrate is maintained at said temperature for at least 10 seconds.

13. The method according to claim 12, wherein said substrate is maintained at said temperature for about 15 to 30 seconds.

14. A radial lip seal, comprising:

a wafer having predetermined physical properties and comprising polytetrafluoroethylene, said wafer having first and second opposed sides separated by a predetermined thickness, said wafer forming a contact sealing surface;

an inductively heatable substrate for supporting said wafer; and a bond formed between said first side of said wafer and said substrate, said bond comprising a region of a fluorinated resin adhesive intermingled with said polytetrafluoroethylene, said adhesive having a melting point less than the melting point of said wafer, said bond being formed by heating by induction and cooling said substrate, said adhesive and said polytetrafluoroethylene, said bond extending through only a portion of said thickness of said wafer and separated from said contact sealing surface such that said predetermined physical properties of said wafer at said contact sealing surface are substantially unaffected by formation of said bond.

15. The seal of claim 14, wherein said adhesive comprises fluorinated ethylene propylene.

16. The seal of claim 14, wherein said adhesive comprises perfluoroalkoxy resin.

* * * * *

UNITED STATES PATENT AND TRADEMARK OFFICE
CERTIFICATE OF CORRECTION

PATENT NO. : 5,198,053
DATED : March 30, 1993
INVENTOR(S) : Eugene A. Duncan It is certified that error appears in the above-identified patent and that said Letters Patent is hereby corrected as shown below:

Column 4, line 19, delete "form manufacture and" and insert thereat
--manufacture and form--.

Column 4, line 36, delete "thermocoup'e" and insert thereat
--thermocouple--

Column 8, line 3, after 'power' insert thereat
--to the induction unit to about 0% power.--

Signed and Sealed this

First Day of February, 1994

*Attest:*

BRUCE LEHMAN

*Attesting Officer*    *Commissioner of Patents and Trademarks*